United States Patent
Pakko et al.

(10) Patent No.: US 9,739,223 B2
(45) Date of Patent: Aug. 22, 2017

(54) SYSTEM AND METHOD FOR BYPASSING A PARTICULATE FILTER

(71) Applicant: Ford Global Technologies, LLC, Dearborn, MI (US)

(72) Inventors: James David Pakko, Dearborn, MI (US); Mark Kreger, Monroe, MI (US); Jimmy Theis, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2 days.

(21) Appl. No.: 14/945,184

(22) Filed: Nov. 18, 2015

(65) Prior Publication Data
US 2017/0138283 A1   May 18, 2017

(51) Int. Cl.
| | |
|---|---|
| *F01N 3/031* | (2006.01) |
| *F02D 41/02* | (2006.01) |
| *F01N 3/10* | (2006.01) |
| *F02D 41/26* | (2006.01) |

(52) U.S. Cl.
CPC ......... *F02D 41/0235* (2013.01); *F01N 3/031* (2013.01); *F01N 3/101* (2013.01); *F02D 41/26* (2013.01)

(58) Field of Classification Search
CPC ...... F02D 41/0235; F02D 41/26; F01N 3/101; F01N 3/031; F01N 3/0235; F01N 3/2053; F01N 2240/20; F01N 1/16; F01N 1/163; F01N 1/165; F01N 1/166; F01N 1/18
USPC ....... 123/672, 675, 676, 679, 682, 685, 689; 60/287, 288, 292, 296, 324
See application file for complete search history.

(56) References Cited

U.S. PATENT DOCUMENTS

| | | | |
|---|---|---|---|
| 4,373,330 A | 2/1983 | Stark | |
| 4,974,414 A | 12/1990 | Kono et al. | |
| 5,063,736 A | 11/1991 | Hough et al. | |
| 5,105,619 A | 4/1992 | Arai | |
| 5,620,490 A * | 4/1997 | Kawamura | F01N 3/0226 55/282.3 |
| 5,651,248 A * | 7/1997 | Kawamura | B01D 46/0063 55/283 |
| 5,651,250 A * | 7/1997 | Kawamura | B01D 39/2086 55/312 |
| 5,908,047 A | 6/1999 | Nakamura et al. | |
| 6,464,947 B2 | 10/2002 | Balland | |

(Continued)

OTHER PUBLICATIONS

Martin, Douglas Raymond et al., "Method and System for Gas Particulate Filter," U.S. Appl. No. 14/540,307, filed Nov. 13, 2014, 50 pages.

(Continued)

*Primary Examiner* — Hai Huynh
(74) *Attorney, Agent, or Firm* — Julia Voutyras; McCoy Russell LLP

(57) ABSTRACT

Methods and systems are provided for an emission control device for an engine system including a gasoline particulate filter (GPF) and bypass passage for the GPF. In one example, the system may include a converging cone to direct exhaust flow through a central bypass passage, housing a valve, which originates upstream of the GPF and eventually passes through the center of it (thereby bypassing the GPF). In another example exhaust flow may travel through outer passages, coupled between the converging cone and GPF and spaced around the central bypass passage, to travel to the GPF.

20 Claims, 5 Drawing Sheets

(56) References Cited

U.S. PATENT DOCUMENTS

| | | | |
|---|---|---|---|
| 6,679,052 B2* | 1/2004 | Nakatani | F01N 3/0233 60/286 |
| 6,708,485 B2* | 3/2004 | Hinder | F01N 3/0814 60/288 |
| 6,874,316 B2* | 4/2005 | Nakatani | F01N 3/0231 60/286 |
| 7,051,521 B2* | 5/2006 | Funabashi | F01N 3/0814 422/170 |
| 7,992,382 B2 | 8/2011 | Bailey | |
| 8,464,689 B2 | 6/2013 | Born et al. | |
| 8,475,754 B2* | 7/2013 | Eigenberger | F01N 3/2892 422/115 |
| 8,590,294 B2 | 11/2013 | Brahma | |
| 9,238,982 B2 | 1/2016 | Springer et al. | |
| 9,239,019 B2 | 1/2016 | Lambert et al. | |
| 9,482,125 B2* | 11/2016 | Gonze | F01N 3/031 |
| 2006/0185353 A1 | 8/2006 | Liu et al. | |
| 2012/0060482 A1 | 3/2012 | Gonze et al. | |
| 2012/0124977 A1 | 5/2012 | Choe | |
| 2013/0202495 A1 | 8/2013 | Lupescu et al. | |
| 2013/0216439 A1 | 8/2013 | Johansen | |
| 2014/0338644 A1 | 11/2014 | MacNeille et al. | |

OTHER PUBLICATIONS

Lambert, Christine Kay et al., "Emission Control Device Regeneration," U.S. Appl. No. 14/594,324, filed Jan. 12, 2015, 55 pages.

Solger, Michael, "Methods and Systems for Rotating an Exhaust Aftertreatment Device," U.S. Appl. No. 14/922,570, filed Oct. 26, 2015, 38 pages.

* cited by examiner

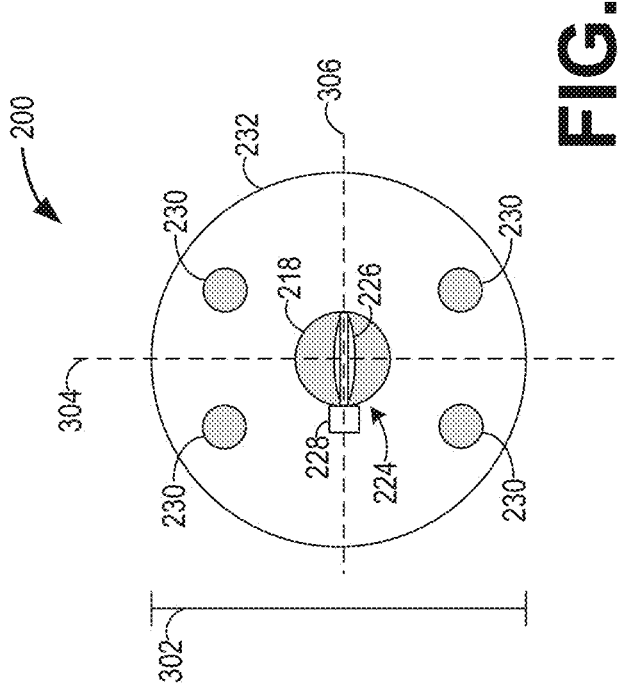

SYSTEM AND METHOD FOR BYPASSING A PARTICULATE FILTER

FIELD

The present description relates generally to methods and systems for an exhaust after treatment system of a motor vehicle.

BACKGROUND/SUMMARY

Some internal combustion engines employ a gasoline particulate filter (GPF) in an exhaust system to trap particulate matter flowing through the exhaust system and thereby meet emission standards. GPFs may be constructed of porous ceramics, or other porous materials. Regardless of the specifics of the design, the purpose of the filter is to filter soot particles, the soot particles consisting of solid carbon often with adsorbed hydrocarbons, out of exhaust gas flowing through the filter and then hold the filtered soot particles within the filter until the filter is regenerated by combusting soot to form gaseous products. Soot is produced in a gasoline engine primarily in the first few minutes following cold start. In addition to soot, the exhaust gas also carries incombustible solid material, which may be referred to as ash, which may also be trapped by the GPF. However, since the ash is incombustible, it may remain in the filter for its useful life. Ash is derived primarily from lubricating oil entering the combustion chamber or exhaust ports. Other sources include corrosion from the exhaust manifold and debris from the upstream catalytic converter. Ash is produced during all engine operating modes. As particulate matter (e.g., ash and soot) accumulates in a particulate filter (e.g., the GPF), exhaust backpressure may increase, which can adversely affect fuel economy. While actively regenerating the GPF may remove the stored soot, the stored ash may remain within the filter after regeneration, and thus the exhaust backpressure created by the GPF may only partially be reduced. As such, the ash may continue to contribute to the exhaust backpressure on the engine, thereby reducing engine torque output and/or engine fuel economy.

Other attempts to address particulate matter build-up within a GPF include employing a bypass system that bypasses exhaust flow around the GPF. Specifically, the bypass system may include a bypass passage in parallel with the GPF and a valve disposed within the bypass passage for controlling flow through the bypass passage. One example approach is shown by Gonze et al. in U.S. Patent Application No. 2012/0060482. Therein, Gonze discloses methods of regenerating a gasoline particulate filter (GPF) in a spark-ignition engine. Gonze also discloses a GPF bypass apparatus for the GPF wherein an annular channel extends through the central axis of the GPF. The portion of the annular channel which is closest to the upstream catalytic converter (i.e., where exhaust first comes into contact with the GPF and channel) is outfitted with an operable valve to direct exhaust gasses during various operating conditions of the vehicle.

Another example approach is shown by Kono et al in U.S. Pat. No. 4,974,414 and Arai et al in U.S. Pat. No. 5,105,619 which also disclose methods and systems for regenerating a particulate filter in a spark-ignition engine. Both references employ a bypass passage around a GPF, the bypass passage including a valve with a portion of the valve arranged external to the bypass passage. The bypass passage runs parallel to and outside of the GPF, adjacent to the GPF.

However, the inventors herein have recognized potential issues with such systems. As one example, the valve situated at the mouth of the annular passage (e.g., within the GPF enclosure, as shown in Gonze) makes access to said valve for repair/replacement difficult, and traps heat within the system, posing a challenge to component durability. As another example, bypass passages located adjacent and parallel to the GPF enclosure increase the diameter and/or width of the system, thereby increasing the total packaging space of the GPF system and emission control devices.

As one example, the issues described above may be addressed by an apparatus including a gasoline particulate filter (GPF) arranged in an exhaust passage, a central bypass passage including a first portion disposed upstream of the GPF and a second portion passing through a center of the GPF, a converging cone forming a portion of the exhaust passage and arranged upstream of and connecting to the first portion, one or more outer passages coupled between the converging cone and the GPF and spaced away from the central bypass passage, and a valve arranged within the first portion. In this way, packing size of an exhaust system including the GPF may be reduced and the valve in the central bypass passage may be more easily accessed for repair and/or replacement.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3 is a cross section of the example emission control device of FIG. 2B.

DETAILED DESCRIPTION

Figure 1:
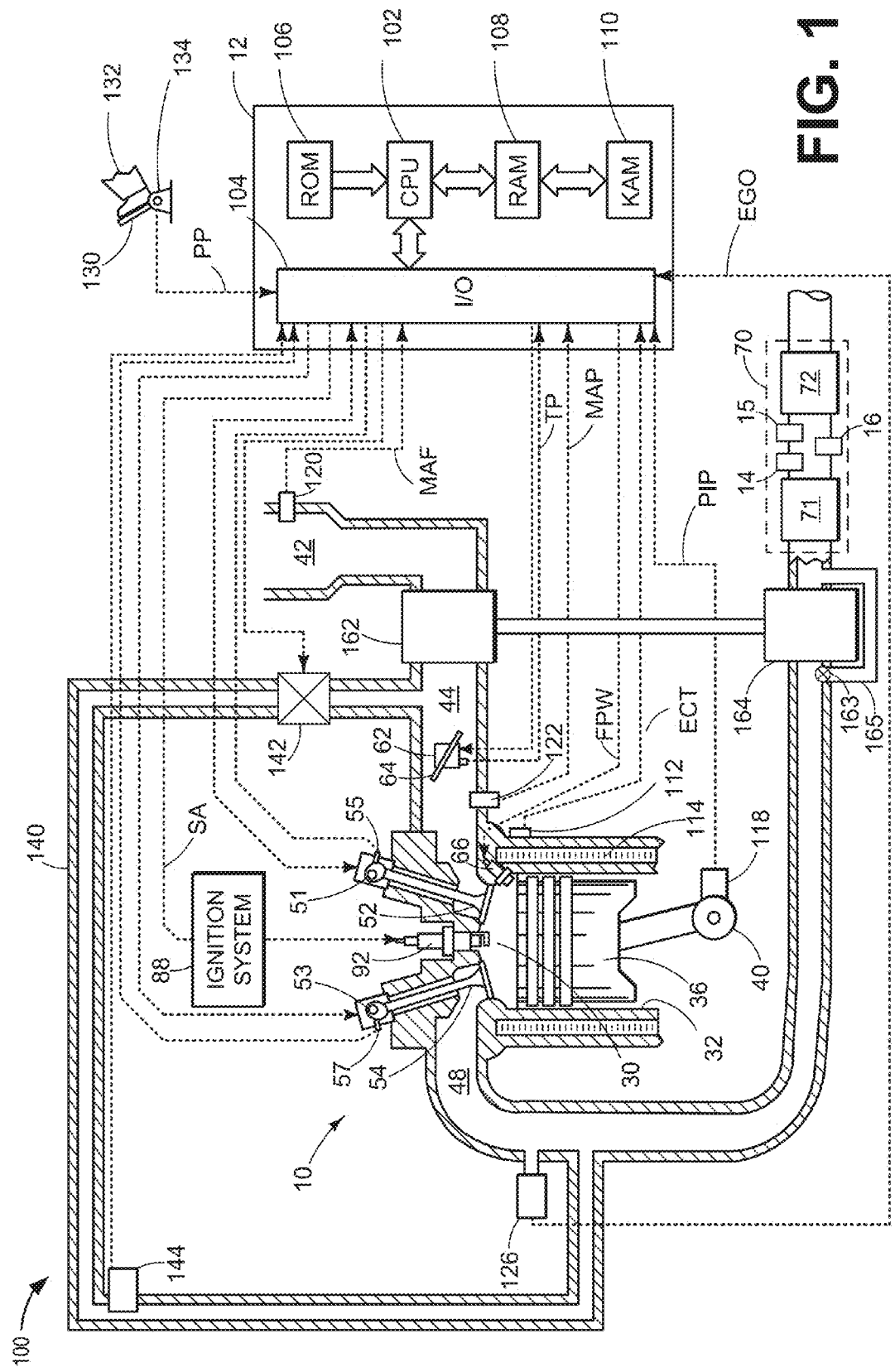
FIG. 1 is a block diagram of an engine system in a vehicle.
Figure 2A:
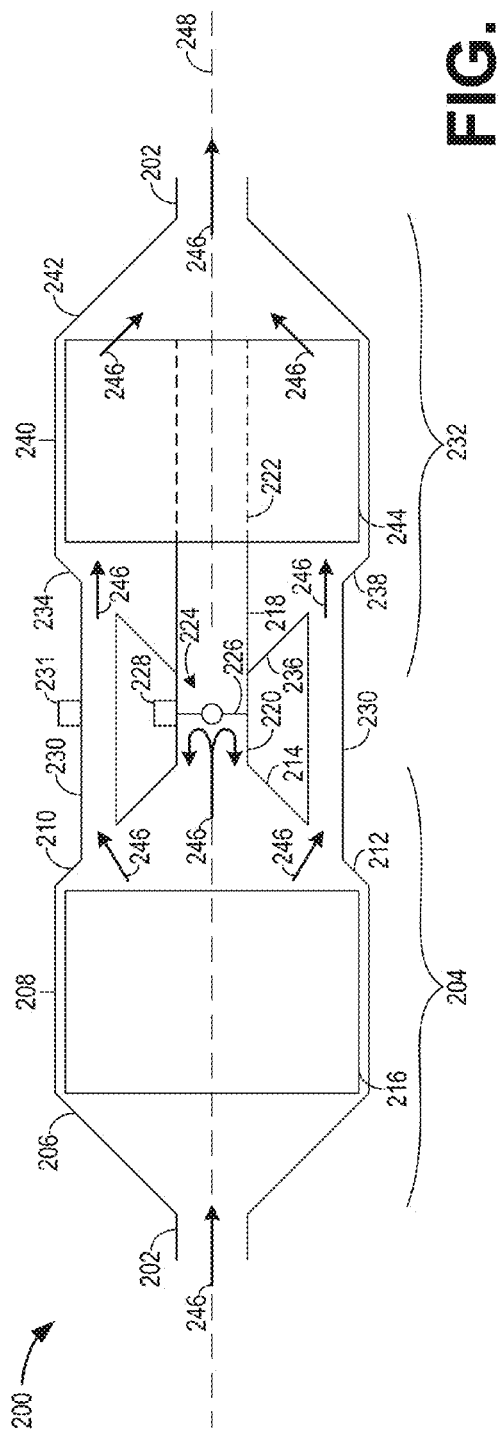
FIG. 2A shows an example emission control device including a gasoline particulate filter (GPF) and a GPF bypass passage with a bypass valve in a first position.
Figure 2B:
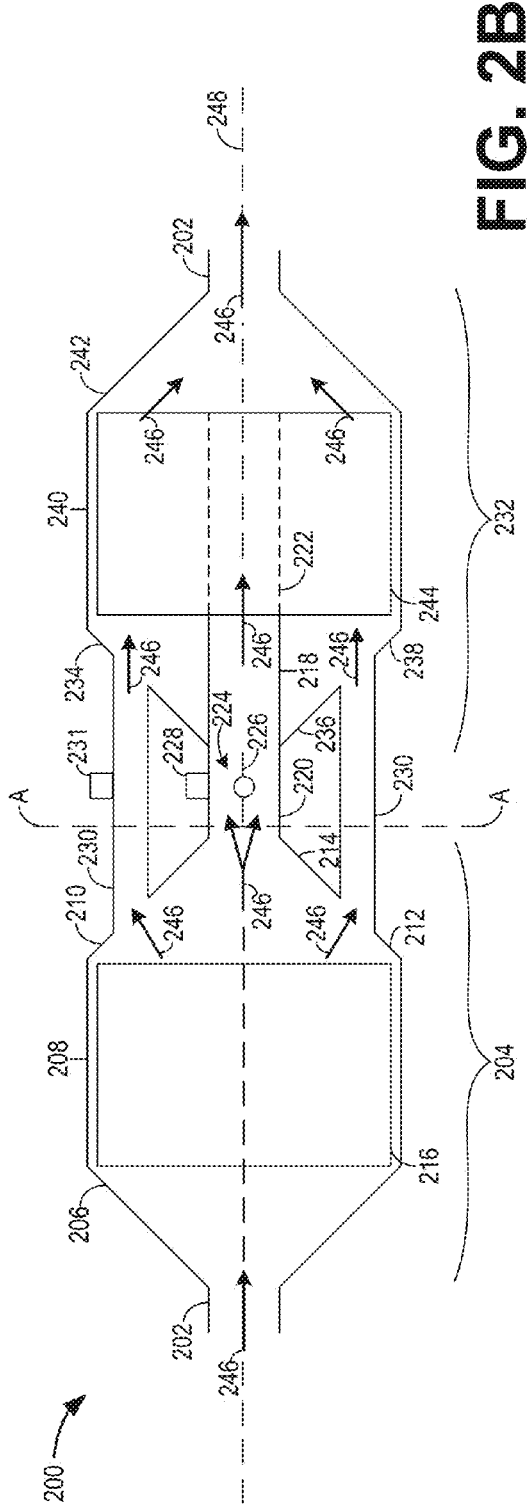
FIG. 2B shows the example emission control device including the GPF and the GPF bypass passage with the bypass valve in a second position.
Figure 4:
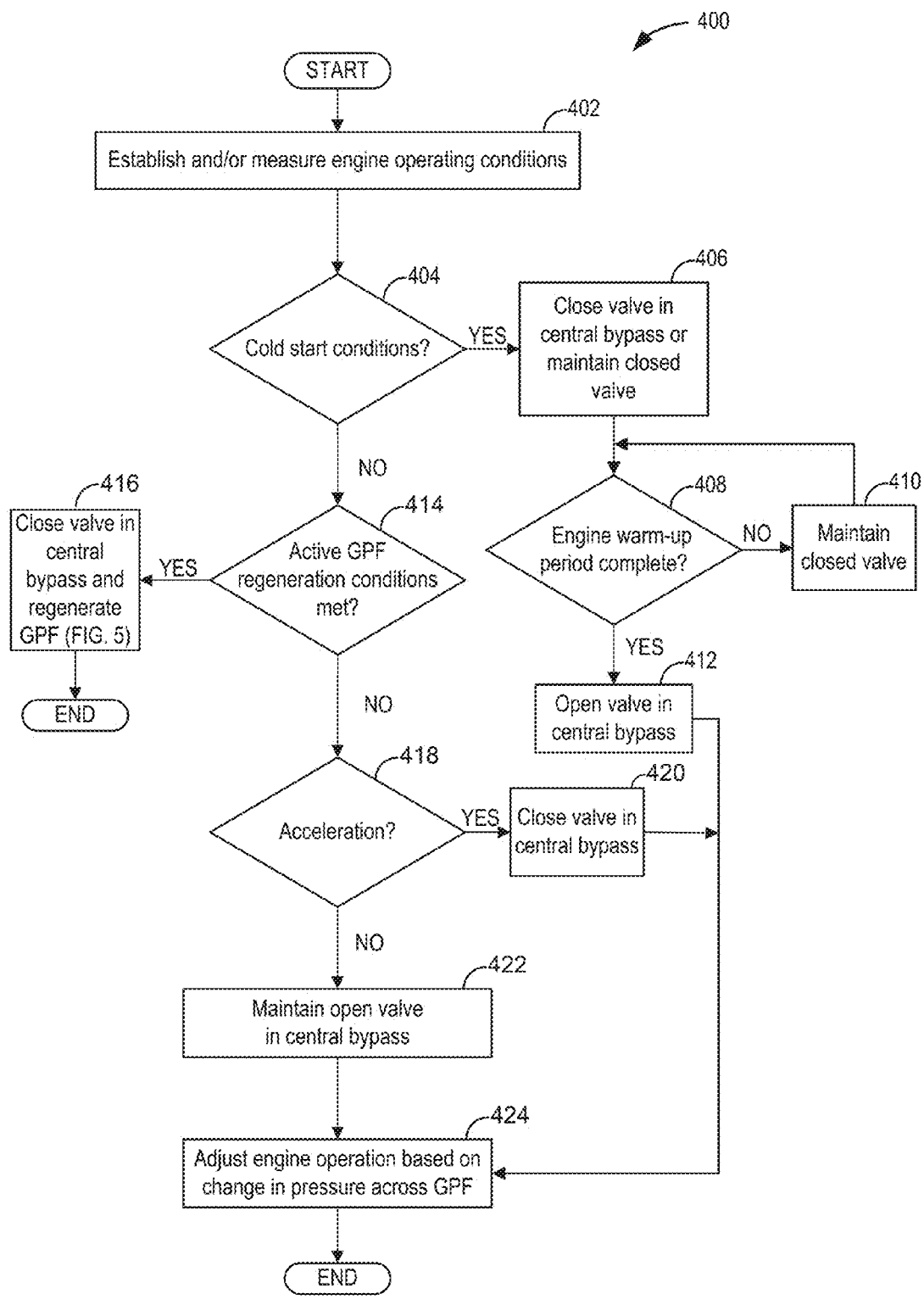
FIG. 4 shows a flowchart illustrating a method of adjusting a GPF bypass valve arranged in a bypass passage for a GPF in response to engine operating conditions.
Figure 5:
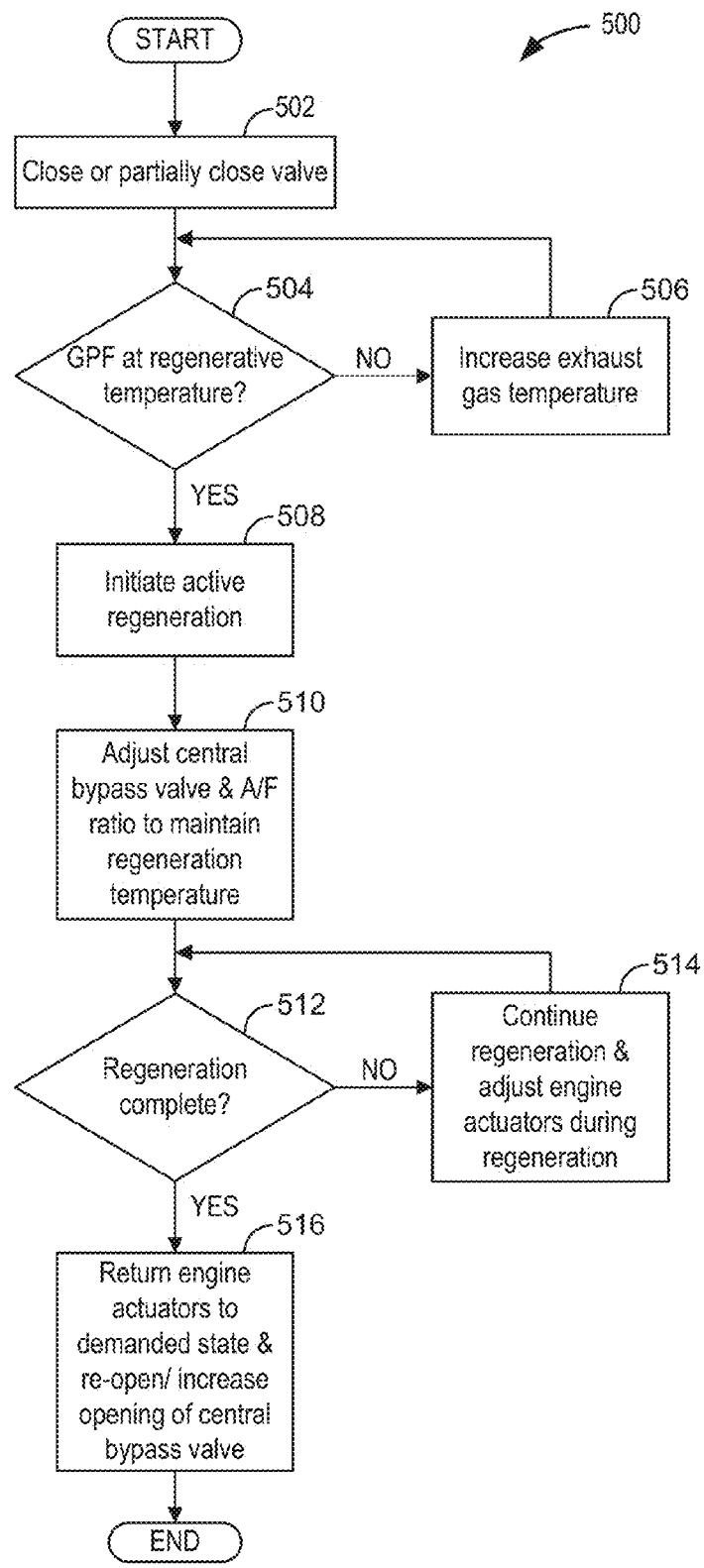
FIG. 5 shows a flowchart illustrating a method of performing a GPF regeneration event in an emission control device including a GPF.

The following description relates to systems and methods for an emission control device including a gasoline particulate filter (GPF) in an engine system, such as the engine system shown in FIG. 1. As shown in FIG. 1, the emission control device may be arranged downstream of engine cylinders of an engine of the engine system, in an exhaust passage of the engine system. The GPF filters particulate matter from exhaust gases flowing through the exhaust passage before exiting the engine system. However, while some of these particles (e.g., soot) may be removed from the filter via regeneration events, other non-combustible particles (such as ash) may remain within the GPF for a lifetime of the filter, thereby increasing a pressure drop across the GPF and subsequently increasing an exhaust backpressure on the engine. Thus, the emission control device may include a bypass passage which allows exhaust gases from the engine cylinders to bypass the GPF under certain engine operating conditions (e.g., such as when ash may be flowing through the exhaust passage or during conditions of reduced soot production). FIGS. 2A-2B show an example of such an emission control device where the bypass passage is a central bypass passage that extends through a center of the GPF. As shown in FIGS. 2A-2B, the central bypass passage includes a valve adjustable via a controller of the engine system to selectively allow a different percentage of exhaust gases to pass through the GPF (via a plurality of peripheral passages positioned around the central bypass passage) or bypass the GPF through the bypass passage. As shown in a cross-section of the emission control device of FIGS. 2A-2B, depicted in FIG. 3, the peripheral passages and central bypass passage may be spaced apart from one another while still being positioned within an outer diameter (or width) of the emission control device, as defined by a housing of the GPF and/or additional emission control devices (e.g., catalysts) of the emission control device. FIG. 4 shows a flowchart illustrating a method for controlling the valve in response to a number of vehicle operating conditions. After a period of engine use, particulate matter may build-up in the GPF, thereby causing a pressure drop across the filter to increase. As a result, the controller may initiate active regeneration of the GPF to burn soot from the filter, as shown in FIG. 5. As also shown in FIG. 5, the controller may adjust a position of the valve during the regeneration event to maintain desired conditions for the regeneration event. In this way, adjusting the valve in the central bypass passage may reduce an amount of un-combustible particulate matter being stored within the GPF, thereby reducing the backpressure on the engine and increasing a longevity of the GPF. Additionally, the arrangement of the peripheral passages and central bypass passage may allow the valve to be serviced more easily while also reducing a packaging space of the emission control device within the engine system.

FIG. 1, schematically illustrates one cylinder of multi-cylinder engine 10, which may be included in a propulsion system of an automobile. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. In some embodiments, the face of piston 36 inside cylinder 30 may have a bowl. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via a respective intake valve 52 and exhaust valve 54. In some embodiments, combustion chamber 30 may include two or more intake valves and/or two or more exhaust valves.

Intake valve 52 may be controlled by controller 12 via electric valve actuator (EVA) 51. Similarly, exhaust valve 54 may be controlled by controller 12 via EVA 53. Alternatively, the variable valve actuator may be electro hydraulic or any other conceivable mechanism to enable valve actuation. During some conditions, controller 12 may vary the signals provided to actuators 51 and 53 to control the opening and closing of the respective intake and exhaust valves. The position of intake valve 52 and exhaust valve 54 may be determined by valve position sensors 55 and 57, respectively. In alternative embodiments, one or more of the intake and exhaust valves may be actuated by one or more cams, and may utilize one or more of cam profile switching (CPS), variable cam timing (VCT), variable valve timing (VVT) and/or variable valve lift (VVL) systems to vary valve operation. For example, cylinder 30 may alternatively include an intake valve controlled via electric valve actuation and an exhaust valve controlled via cam actuation including CPS and/or VCT.

Fuel injector 66 is shown coupled directly to combustion chamber 30 for injecting fuel directly therein in proportion to the pulse width of signal FPW received from controller 12. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Intake passage 42 or intake manifold 44 may include a throttle 62 having a throttle plate 64. In this particular example, the position of throttle plate 64, or a throttle opening, may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass airflow sensor 120 and a manifold air pressure sensor 122 for providing respective signals MAF and MAP to controller 12.

Further, in the disclosed embodiments, an exhaust gas recirculation (EGR) system 100 may route a desired portion of exhaust gas from exhaust passage 48 to intake manifold 44. In this example, high pressure (HP) EGR passage 140 is illustrated. The amount of EGR provided to intake manifold 44 may be varied by controller 12 via HP EGR valve 142. Further, an EGR sensor 144 may be arranged within the HP EGR passage 140 and may provide an indication of one or more of pressure, temperature, and concentration of the exhaust gas. Alternatively, the EGR flow may be controlled through a calculated value based on signals from the MAF sensor (upstream), MAP (intake manifold), MAT (manifold gas temperature) and the crank speed sensor. Further, the EGR flow may be controlled based on an exhaust O2 sensor and/or an intake oxygen sensor (intake manifold). Under some conditions, the EGR system may be used to regulate the temperature of the air and fuel mixture within the combustion chamber and/or the temperature proximate to GPF 72. While FIG. 1 shows a high pressure EGR system, a low pressure EGR system may additionally, or alternatively, be used. In a low pressure EGR system, EGR may be routed from downstream of a turbine of a turbocharger to upstream of a compressor of the turbocharger, as show in FIG. 1.

As such, engine 10 may further include a compression device such as a turbocharger or supercharger including at least a compressor 162 arranged along intake manifold 44. For a turbocharger, compressor 162 may be at least partially driven by a turbine 164 (e.g., via a shaft) arranged along exhaust passage 48. For a supercharger, compressor 162 may be at least partially driven by the engine 10 and/or an electric machine, and may not include a turbine. Thus, the amount of compression provided to one or more cylinders of the engine via a turbocharger or supercharger may be varied by controller 12.

Upstream of turbine 164 and coupled between exhaust passage 48 and a bypass passage 165 is a wastegate valve 163. Depending on position of the wastegate valve, the amount of exhaust gas passing turbine 164 may be controlled. Position of wastegate valve 163 may be controlled via a wastegate actuator (not shown, and which may be hydraulic, pneumatic, electric, or mechanical in nature) responding to a signal from controller 12. For example, the controller 12 may want to increase torque, and may accomplish this by increasing boost pressure. One way to increase boost pressure is to increase the amount of energy going to turbine 164. For more energy to turbine 164, the controller may signal the wastegate actuator to change wastegate valve 163 to a first position, or maintain a first position, (e.g., fully closed) that is such that no exhaust may travel through bypass passage 165 and all exhaust gas must pass turbine 164. Conversely, to decrease boost pressure, the controller 12 may signal the wastegate actuator to cause the wastegate valve 163 to assume, or maintain, a second position (e.g., fully open) to allow a percentage of exhaust gas traveling from exhaust passage 48 to flow past the wastegate valve 163, through bypass passage 165, thereby bypassing turbine 164, until the bypass passage 165 reconnects to exhaust passage 48 downstream of turbine 164. It will be appreciated that wastegate valve 163 may assume a plurality of intermediate positions (in response to controller 12 signaling the wastegate actuator to change position of the wastegate valve 163) residing between the first (e.g., fully closed) and second (e.g., fully open) positions, so that variable amounts of exhaust gas may travel through bypass passage 165, thereby bypassing turbine 164.

Exhaust gas sensor 126 is shown coupled to exhaust passage 48 upstream of emission control device (ECD) 70. Exhaust gas sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Although oxygen sensor 14 and temperature sensor 16 are shown in addition to exhaust gas sensor 126 in FIG. 1, one or more of these sensors may be omitted and/or moved.

Emission control device (ECD) 70 is shown arranged along exhaust passage 48 downstream of exhaust gas sensor 126. In this example, ECD 70 includes a three way catalytic converter (TWC) 71, a gasoline particulate filter (GPF) 72, and a pressure sensor 15. In some embodiments, GPF 72 may include one or more catalyst materials in addition to components configured to filter exhaust gas. For example, GPF 72 may be coated with a wash-coat including one or more catalyst materials. Such a configuration may be employed for embodiments in which engine 10 is spark-ignited, for example. In some embodiments, the TWC 71 and GPF 72 may be separate components comprising separate housings positioned away from one another (e.g., the TWC being upstream of the GPF as shown in FIGS. 1, 2A, and 2B), with a valve between them (not shown in FIG. 1), arranged on/in a GPF bypass passage located along a common axis. Details regarding exemplary ECDs are provided below with reference to FIGS. 2A and 2B. It will be understood, however, that ECD 70 is provided as a non-limiting example and that, in other embodiments, the ECD may include other components in addition to or in lieu of TWC 71 and/or GPF 72, including but not limited to a lean NOx trap, an SCR catalyst, a diesel or gasoline particulate filter, an oxidation catalyst, or an alternative gas treatment device. For example, in some embodiments, an alternate catalyst or exhaust after treatment device may be positioned upstream of the GPF 72, in place of the TWC 71.

Controller 12 is shown in FIG. 1 as a microcomputer, including microprocessor 102, input/output ports 104, an electronic storage medium (e.g., computer-readable) for executable programs and calibration values shown as read-only memory 106 in this particular example, random access memory 108, keep alive memory 110, and a data bus. Controller 12 may receive various signals from sensors coupled to engine 10, in addition to those signals previously discussed, including measurement of inducted mass airflow (MAF) from mass airflow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP), or throttle opening, from a throttle position sensor; and absolute manifold pressure signal, MAP, from pressure sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft. The controller 12 receives signals from the various sensors of FIG. 1 (e.g., pressure sensor 15, temperature sensor 112, pedal position sensor 134, etc.) and employs the various actuators (e.g., a valve actuator of a valve in a bypass passage of the GPF 72, as shown in FIGS. 2A-2B, throttle plate 64, spark plug 92, wastegate valve actuator 163, etc.) of FIG. 1 to adjust engine operation based on the received signals and instructions stored on a memory of the controller. For example, adjusting a percentage of exhaust gasses flowing through GPF 72 (as described further below with reference to FIG. 4) may include sending a signal from the controller to an actuator of a valve (such as valve 224 shown in FIGS. 2A-2B) within ECD 70 to regulate valve positioning, thereby adjusting the percentage of exhaust gasses flowing through GPF 72.

Storage medium read-only memory 106 can be programmed with computer readable data representing instructions executable by microprocessor 102 for performing the methods described herein, as well as other variants that are anticipated but not specifically listed. As described above, FIG. 1 shows only one cylinder of a multi-cylinder engine, and each cylinder may similarly include its own set of intake/exhaust valves, fuel injector, spark plug, etc.

FIGS. 2A-2B and 3 show a portion of an exhaust passage in a vehicle exhaust system (such as exhaust passage 48 in FIG. 1) including an emission control device (ECD) 200. In some examples, ECD 200 may be ECD 70 of FIG. 1. FIGS. 2A-2B show a side view of the ECD 200 where the ECD 200 includes a central axis 248 running through a center of the ECD 200. FIG. 3 shows a cross section of the ECD 200 which is arranged such that a vertical axis 304 is perpendicular to the central axis 248 seen in each of FIGS. 2A and 2B. The cross section of FIG. 3 is taken downstream of a TWC housing 204 of FIGS. 2A and 2B, and upstream of a valve 224 of FIGS. 2A-2B, as shown by cross section A-A of FIGS. 2A-2B.

As shown in FIGS. 2A-2B, ECD 200 includes a TWC 216, a GPF 244, and the operable valve 224 located along a central bypass passage 218 (residing along the central axis 248 of an exhaust passage 202 and GPF 244), and one or more peripheral passages 230. Central bypass passage 218 and peripheral passages 230 connect a TWC housing 204 of the TWC 216 to a GPF housing 232 of the GPF 244.

The TWC 216 is arranged in the exhaust passage 202, upstream of the GPF 244. Furthermore, the TWC 216 is arranged within the TWC housing 204, the TWC housing 204 comprising a diverging cone 206 upstream of and coupled to a central portion 208, which is upstream of and coupled to a converging cone 210 of the TWC housing 204. The central portion 208 of TWC housing 204 has an inner circumferential face in face sharing contact with the outer circumferential face of the TWC 216, such that the central portion 208 is formed around and encloses elements of the TWC. As used herein, a diverging cone has angled sidewalls that angle outward from a narrower, upstream region, to a wider, downstream region of the diverging cone. Conversely, a converging cone has angled sidewalls that angle inward from a wider, upstream region, to a narrower, downstream region of the converging cone. Moving downstream, the converging cone 210 forms a portion of the exhaust passage and includes a wider, first portion 212 (i.e., first end) and a narrower, second portion 214 (i.e., second end), where the first end is coupled to an upstream portion of the exhaust passage and the second end is coupled directly to an entrance to a first portion 220 of the central bypass passage 218. Said another way, the converging cone 210 includes a wall that angles inward from the first portion 212 (i.e., first end) to the second portion 214 (i.e., second end downstream of the first end), where it is coupled to the first portion 220 of the central bypass passage 218 (located downstream of the first end).

The central bypass passage 218 includes the first portion 220 disposed upstream of the GPF 244 and a second portion 222 passing through a center of the GPF 244, centered along the central axis 248. More specifically, the central bypass passage 218 includes the first portion 220 disposed upstream of the GPF 244, and the second portion 222 passing through a center aperture of the GPF 244 formed around the central axis 248. The first portion 220 of the central bypass passage 218 includes a valve 224 disposed within it. Valve 224 may be referred to herein as a bypass valve and is adjustable via a controller (such as controller 12 shown in FIG. 1) into a plurality of positions (e.g., a plurality of positions between fully open and fully closed and including the fully open and fully closed positions). In this way, the valve 224 may be actively controlled based on engine operating conditions, as discussed further below with reference to FIGS. 4-5.

The valve 224 includes a valve plate 226 and a valve actuator 228, where at least a portion of the valve actuator 228 is disposed external to an interior of the first portion 220 of the central bypass passage 218 and the valve plate 226 is positioned within the interior of the first portion 220 of the central bypass passage 218. Furthermore, the portion of the valve actuator 228 that is disposed external to the interior of the first portion of the central bypass passage 218 is positioned within a space formed between an outer wall of the central bypass passage 218 and an outer wall of the one or more peripheral passage 230 (i.e., outer passages). The position of the valve 224 may be adjusted by a controller (such as controller 12 of FIG. 1) having computer readable instructions stored in a memory of the controller for actuating such an adjustment. The controller may signal the actuator 228 of the valve 224 to actuate the valve into a first position (i.e., fully closed position), as seen in FIG. 2A, such that the valve plate 226 of the valve 224 blocks exhaust gas from flowing through the central bypass passage 218. Alternatively, the controller may signal (e.g., send a signal to) the actuator 228 of the valve 224 to actuate the valve into a second position (i.e., fully open position), as seen in FIG. 2B, such that the valve plate 226 of the valve 224 is open to exhaust gas flowing through the central bypass passage 218. As one example, the actuator 228 may include a motor or hydraulic actuator that moves (e.g., rotates) the valve plate 226 of valve 224 into different positions within the interior of the central bypass passage 218. Due to its external location, the actuator 213 may be accessible for maintenance, repair, and/or replacement. Further details regarding valve 224 position, exhaust flow, and engine operating conditions that lead to a change in the position of the valve 224 may be found further below.

Returning to FIGS. 2A and 2B, in addition to the converging cone 210 of the TWC housing 204 being coupled to the central bypass passage 218, the converging cone 210 of the TWC housing is also coupled to one or more peripheral passages 230 (i.e., outer passages). The peripheral passages 230 are coupled between the converging cone 210 and the GPF 244, and are spaced away from the central bypass passage 218. More specifically, the plurality of peripheral passages 230 are positioned between the converging cone 210 and a diverging cone 234 of the GPF housing 232. For example, each of the peripheral passages 230 are coupled between the first portion 212 of the converging cone 210 and a second portion 238 of the diverging cone 234. The one or more peripheral passages 230 are spaced circumferentially around an exterior of the central bypass passage 218, but within an outer diameter of one of the exhaust passage upstream of the converging cone 210 or a central portion 240 of the GPF housing 232. In this way, the peripheral passages 230 may be contained within a packaging space defined by the exhaust passage, GPF housing 232, and/or TWC housing 204. At least one of the one or more peripheral passages 230 are equipped with a pressure sensor 231 (which may be similar to pressure sensor 15 shown in FIG. 1), where a portion of the pressure sensor 231 may be disposed external to an interior of the peripheral passage 230 and a portion of the pressure sensor 231 may be positioned within the interior of the peripheral passage 230 for measuring a pressure of exhaust gas flowing through the peripheral passage 230. Thus, the pressure sensor may be in communication with the controller. In alternate embodiments, the pressure sensor 231 may be coupled to one of the converging cone 210 or diverging cone 234 such that the pressure sensor is disposed upstream of the GPF 244. Peripheral passages 230 allow different percentages of exhaust gasses to pass from the TWC housing 204 to the GPF housing 232, depending on position of the valve 224, as discussed further below.

As mentioned above, peripheral passages 230 are coupled to the downstream GPF housing 232. For example, an upstream, first end of the peripheral passages 230 is coupled to the converging cone 210 and a downstream, second end of the peripheral passages 230 is coupled to the diverging cone 234 of the GPF housing 232. GPF housing 232 comprises the diverging cone 234 upstream of and coupled to a central portion 240 of the GPF housing 232, which is upstream of and coupled to a second converging cone 242 of the GPF housing 232. The diverging cone 234, forming a portion of the housing of the GPF, is arranged upstream of the GPF 244 and downstream of an entrance to the first portion 220 of the central bypass passage 218. The diverging cone 234 includes a narrower, first portion 236 (i.e., first end) coupled to an outer wall of the first portion 220 of the central bypass passage 218 and a wider, second portion 238 (i.e., second end) coupled to the central portion 240 of the housing of the GPF (i.e., GPF housing 232) that surround the GPF 244. The central portion 240 of the housing of the GPF (i.e., GPF housing 232) is formed around and encloses filter elements of the GPF 244, and is coupled between the diverging cone 234 and second converging cone 242, wherein the second converging cone is arranged downstream of the GPF 244. The GPF 244, arranged in the exhaust passage 202 and having the central axis 248, is arranged circumferentially around an outer perimeter of the central bypass passage 218, specifically, the second portion 222 of the central bypass passage 218.

Having disclosed the structural elements of ECD 200 in FIGS. 2A and 2B, the path that an exhaust flow 246 may take in ECD 200, depending on position of the valve 224, may be discussed further. The position of the valve 224 may be changed or maintained depending on engine operating conditions in order to adjust the percentage of exhaust flow 246 flowing through the peripheral passages 230 and through the GPF 244. Specifically, FIG. 2A shows the exhaust flow 246 through the ECD 200 when the valve 224 is in the first position (e.g., closed position), thereby blocking exhaust gases from flowing through the central bypass passage 218. FIG. 2B shows the exhaust flow 246 through the ECD 200 when the valve 224 is in the second position (e.g., open position), thereby allowing exhaust gases to flow through the central bypass passage 218. As introduced above, the exhaust flow 246 through the ECD 200 may comprise exhaust gases flowing through the exhaust passage in which the ECD 200 is installed, from one or more engine cylinders.

Looking at FIG. 2A, exhaust flow 246 first enters ECD 200 through the exhaust passage 202 and subsequently enters the diverging cone 206 of the TWC housing 204. All exhaust flow 246 then passes through TWC 216, and into converging cone 210. The angled, narrowing shape of the converging cone 210 (as previously discussed) directs exhaust gasses to the first portion 220 of the central bypass passage 218. Owing to the valve 224 being in a fully closed (i.e., first) position, no exhaust flow may continue downstream in the first portion 220 of the central bypass passage 218, and is thus directed back towards the upstream converging cone 210. All of the exhaust flow 246 is thus directed to travel through one or more peripheral passages 230, coupled to the wider portion of the converging cone 210, and eventually downstream to the diverging cone 234 of GPF housing 232. Alternatively, some of the exhaust flow 246 may initially travel through peripheral passages 230 after exiting the TWC 216, without first being directed to the first portion 220 of the central bypass passage 218. All of the exhaust flow 246 then passes through the elements (e.g., filtering elements) of GPF 244, and into the downstream second converging cone 242 of the GPF housing 232. Thus, all the exhaust flow 246 is filtered by the GPF 244 when the valve 224 is fully closed. The exhaust flow 246 may then continue through the most downstream portion of ECD 200, exhaust passage 202, where it then exits ECD 200. Some examples for when the valve 224 may be in a first position includes one or more of a cold start condition including an engine temperature being below a threshold temperature, an active regeneration event of the GPF, and vehicle acceleration over a threshold level (discussed in greater detail below with reference to FIGS. 4 and 5).

Turning now to FIG. 2B, exhaust flow 246 travels the same initial steps as in FIG. 2A. Exhaust flow 246 first enters ECD 200 through the exhaust passage 202 and subsequently enters the diverging cone 206 of the TWC housing 204. All exhaust flow 246 then passes through TWC 216, and into converging cone 210. The angled, converging inner surface of the converging cone 210 (previously discussed) directs a larger percentage of exhaust flow 246 into the first portion 220 of the central bypass passage 218 than the peripheral passages 230, with the remaining percentage of exhaust flow 246 traveling through the one or more peripheral passages 230. Owing to the valve being in a second position (i.e., fully open), exhaust flow 246 may continue downstream within the central bypass passage 218 to the second portion 222 of the central bypass passage 218. The second portion 222 of the central bypass passage bypasses the GPF (as previously discussed) allowing exhaust flow 246 to travel through the central portion 240 of the GPF housing 232 without passing through the elements, or coming into contact with, the internal elements of the GPF 244. Once exhaust flow 246 exits the second portion 222 of central bypass passage 218, it enters the diverging cone 234 of the GPF housing 232 and travels to the most downstream portion of ECD 200, the exhaust passage 202, where it exits the apparatus. Some examples for when the valve 224 may be in a second position includes one or more of a cold start condition when the engine temperature is at or above a threshold temperature, or when vehicle acceleration is not over the threshold level, and the active regeneration event of the GPF is not occurring (discussed in greater detail in FIGS. 4 and 5). In this way, when the valve 224 is in the second position, a larger, first portion of exhaust gas travels through the central bypass passage 218, thereby bypassing the GPF, while a smaller, remaining second portion of exhaust gas travels through the peripheral passages 230 and through the GPF 244 (e.g., to be filtered by the GPF).

FIGS. 2A and 2B depict a first and second position of the valve, respectively; however, the valve may be in a third position (i.e., intermediate position), where the third position is between the first and second position. The controller may signal the actuator 228 to adjust the position of the valve plate 226 of valve 224 to increase an amount of opening of the valve 224, in order to decrease the percentage of exhaust gas flowing through the peripheral passages 230 and subsequently through the GPF 244. Alternatively, the controller may signal the actuator 228 to adjust the position of the valve plate 226 of valve 224 to decrease the amount of opening of the valve in order to increase the percentage of exhaust gas flowing through the peripheral passages 230 and subsequently through GPF 244.

It will be appreciated that FIG. 2A and FIG. 2B represent only one configuration for ECD 200. Alternative embodiments may contain various numbers of peripheral flow passages, may employ various types of actuators, may use a catalyst or alternative gas treatment device other than a TWC, and/or may use more than one unitary bodied GPF (that is, multiple, smaller GPFs may be used while still maintaining an innermost central GPF bypass passage and an outermost face sharing contact with GPF housing). The passages described in FIG. 2A and FIG. 2B (i.e., exhaust passages 202, peripheral flow passage(s) 230, and the central bypass passage 218) may be annular in shape, or assume a plurality of geometric variants (such as square, hexagonal, etc.) so long as they maintain the ability to allow exhaust gas to flow through their hollow bodies. Furthermore, the shape of the TWC and GPF housings may have a central portion that is circular, square, rectangular, hexagonal, etc. and may be identical to or different than one another (i.e., the central portion of GPF housing may assume a geometric configuration that is the same as, or different to, the geometric configuration of the central portion of the TWC housing). Furthermore, ECD system 200 may have one or more sensors located within the system that may be responsible for monitoring temperature or percentage of exhaust gasses passing through at least one of the central bypass passage 218 and peripheral passage(s) 230. Said sensors may communicate any data gathered to the controller of the vehicle (such as controller 12 seen in FIG. 1), which may respond by signaling an actuator (such as actuator 213 of FIGS. 2A and 2B) to actuate a valve (such as valve 224 of FIGS. 2A and 2B) to change position in response to vehicle operating conditions.

Turning now to FIG. 3, a cross section of the ECD 200 is shown. As introduced above, the cross section of the ECD 200 is arranged such that a vertical axis 304 is perpendicular to the central axis 248 seen in each of FIGS. 2A and 2B. Additionally, the cross section is taken at section A-A shown in FIG. 2B, downstream of the TWC housing 204, and upstream of the valve 224. In this embodiment, four peripheral (i.e., outer) passages 230, and one central bypass passage 218 are shown, whereby exhaust gas may flow from the TWC housing 204 to the GPF housing 232. As shown in FIG. 3, the four peripheral passages 230 surround an outer diameter of the central bypass passage 218. Within the central bypass passage 218, the valve 224 is seen. As introduced above with reference to FIGS. 2A-b, valve 224 is comprised of the valve plate 226 and the actuator 228. Valve plate 226 is housed within the diameter of the central bypass passage 218 and may be operably controlled by actuator 228. Further, each outer surface of each peripheral passages 230 is spaced away from an outer surface of the central bypass passage 218 such that space is formed around the central bypass passage 218. As shown in FIG. 3, the four peripheral passages 230 are spaced circumferentially around the central bypass passage 218. In alternate embodiments, the ECD 200 may include a different number of peripheral flow passages than four. For example, the ECD 200 may include one, two, three, or five peripheral flow passages spaced circumferentially around the central bypass passage 218, but spaced away from the central bypass passage 218.

It will be appreciated that central bypass passage 218 and peripheral passages 230 are contained within a space defined by an outer diameter 302 of a central portion 240 of the GPF housing. Said another way, all of the peripheral passages 230 are positioned interior to the outer diameter 302 of the central portion 240 of the GPF housing in a radial direction (or a direction perpendicular to the central axis of the ECD 200). Containing all passages within a space defined by the outer diameter 302 of the central portion 240 of the GPF housing (yet spacing the peripheral passages 230 away from the central bypass passage 218) allows the ECD to be compact, while still allowing access to the central valve 224. Said yet another way, the vertical distance (as defined by vertical axis 304) and horizontal distance (as defined by a horizontal axis 306) from the central axis (at a center of the valve 224, such as central axis 248 of FIGS. 2A and 2B) to each passage is smaller than the diameter of the central portion 240 of the GPF housing. It will be appreciated that the central portions of the GPF housing and TWC housing define the diameter of the housings, and so the terms "diameter of the central portion of the GPF housing" and "diameter of the central portion of the TWC housing" may be interchangeable with "diameter of the GPF housing" or "GPF housing diameter" and "diameter of the TWC housing" or "TWC housing diameter", respectively. As shown in FIGS. 2A-2B, the TWC housing diameter is the same as the GPF housing diameter; however, in alternative embodiments, the TWC housing diameter may be different from the GPF housing diameter. In the embodiment where the diameters of the GPF housing and TWC housing are different, the peripheral passages 230 may fit within a space defined by a largest of the TWC housing diameter and the GPF housing diameter (such that the peripheral passages 230 do not extend outside of the outer diameter of the GPF or TWC (whichever is largest). In another embodiment, the GPF housing and/or TWC housing may not have circular cross-sections (i.e., may not have an annular central portion), in which case the peripheral passages may fit within a space defined by a height and width (or cross-section) of a housing of the TWC and/or GPF. For example, the GPF and TWC housings may have a hexagonal central portion of identical dimensions (while still maintain a diverging cone upstream of the central portion and converging cone downstream of the central portion), in which case all passages (i.e., peripheral flow passages and the central bypass passage) would be spaced within the cross-section of the hexagonal central portion of the GPF and TWC housings.

The amount of exhaust flow (e.g., percentage of exhaust flow of the total exhaust flow passing through an exhaust passage and entering the ECD 200) passing through peripheral passages 230 is dependent upon the position of the valve 224. When valve 224 is in the aforementioned first position (not shown in FIG. 3), the central bypass passage 218 is be closed to exhaust gasses, leading to approximately 100% of the exhaust gases flowing through the peripheral passages 230 (as schematically depicted in FIG. 2A). When the valve 224 is in the aforementioned second position, as seen in FIG. 3 (also seen in FIG. 2B), the central bypass passage 218 is open so that exhaust gasses travel down the central bypass passage 218 (and past the GPF), and a lower percentage of exhaust gasses will pass through peripheral passages 230 GPF housing 232 and through the GPF 244. The valve 224 may also assume a plurality of intermediate positions between fully closed to exhaust gasses (i.e., first position) and fully open to exhaust gasses (i.e., second position). Intermediate valve positions of valve 224 may affect the percentage of gasses flowing through peripheral passages 230 and central bypass passage 218, such that as valve 224 moves from the second position to the first position (i.e., closed to open) a larger percentage of exhaust gasses will pass through the central bypass passage 218 and a lower percentage of exhaust gasses will pass through the peripheral passages 230.

While central bypass passage 218, peripheral passages 230, and GPF housing 232 are all depicted as annular in shape, alternative embodiments may employ a plurality of geometric configurations. For example, passages may be square, rectangle, hexagonal, etc. Additionally, alternative embodiments may call for varying numbers of peripheral passages 230 (i.e., one or more peripheral flow passages). While valve 224 is shown in FIG. 3 as having an axis perpendicular to the vertical axis 304, alternative embodiments may have the valve 224 axis arranged at angles less or greater than ninety-degrees to the vertical axis 304. Furthermore, FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example.

Turning to FIG. 4, a method for adjusting a valve positioned in a bypass passage disposed through a center of a GPF to vary a percentage of exhaust gas passing through the GPF is shown. As introduced above, an emission control device (such as ECD 200 shown in FIGS. 2A-2B and 3) may include an upstream after treatment device (such as TWC 216 shown in FIGS. 2A-2B) and a GPF (such as GPF 244 shown in FIGS. 2A-2B and 3) and a central bypass passage (such as central bypass passage 218 shown in FIGS. 2A-2B and 3) passing through a center of the GPF which allows exhaust gas to pass through the passage and not through pores (or filtering elements) of the GPF. The central bypass passage includes a valve (such as valve 224 shown in FIGS. 2A-2B and 3) disposed therein, upstream of a portion of the passage passing through the center of the GPF. The valve is adjustable into a plurality of positions to adjust a percentage of exhaust gas flowing through the central bypass passage and/or through the GPF. Instructions for carrying out method 400 and the rest of the methods included herein may be executed by a controller (such as controller 12 shown in FIG. 1) based on instructions stored on a memory of the controller and in conjunction with signals received from sensors of the engine system, such as the sensors described above with reference to FIG. 1. The controller may employ engine actuators of the engine system to adjust engine operation, according to the methods described below. Furthermore, in FIGS. 4 and 5, described below, the valve in the central bypass passage of the GPF may be in a first position, a second position, or an intermediate position lying between the two positions. Additionally, in FIGS. 4 and 5, described below, the valve in the central bypass passage of the GPF may be referred to simply as the "valve". The reader may assume that all valve references in FIGS. 4 and 5 are referring to the valve in the central bypass passage of the GPF (such as valve 224 of FIGS. 2A, 2B, 3), unless otherwise stated. As used herein, when the valve is in a "first position", the valve may be referred to as "closed" (e.g., closed such that exhaust gasses do not flow past the valve and through the central bypass passage), whereby exhaust gasses cannot flow through the central bypass passage, and in response, all exhaust gasses flow through peripheral flow passages surrounding the central bypass passage and connecting the upstream catalyst (e.g., TWC) to the GPF. Additionally, as used herein, when the valve is in a "second position", the valve may be referred to as "open", whereby exhaust gasses can flow through the central bypass passage, and in response, a percentage of exhaust gasses flow through the central bypass passage, while the remaining percentage of exhaust gasses flow through the peripheral flow passages. Furthermore, it will be appreciated that any references to the valve being actuated upon, or a change in valve position (e.g., first, second, open, closed, intermediate, etc.), will imply that the controller is employing an actuator of the valve (which may be at least partially external to the central bypass passage) to move a position of a valve plate of the valve (the valve plate positioned across an interior of the central bypass passage) into the desired position and thus change the amount of exhaust flow passing through the central bypass passage.

FIG. 4 begins at 402, where engine operating conditions are estimated and/or measured. Establishing and/or measuring engine operating conditions may include processing incoming data from sensors within and/or outside of the ECD, determining if the vehicle has just turned on (i.e., cold start), if the vehicle is in cruise control, if the vehicle is accelerating/decelerating, etc. For example, engine operating conditions may include engine speed and/or load, exhaust oxygen content, ambient temperature, engine temperatures, a pressure upstream of the GPF, a percentage of exhaust flowing through the GPF, a temperature of the ECD, an exhaust oxygen content of the ECD, etc.

At 404 the method includes determining if the engine is operating under cold start conditions. Cold start conditions may include starting the engine when a temperature of the engine (and/or an ambient temperature) is below a threshold temperature. The threshold temperature may be based on a nominal operating temperature for the engine where fluids of the engine are heated up to a threshold level. During the cold start phase (e.g., when the engine temperature, or engine coolant temperature, is less than the threshold temperature) the engine may produce soot due to the controller employing a warm-up strategy to heat the catalyst in the exhaust passage (e.g., the TWC) as fast as possible. One aspect of this warm-up strategy may include late fuel injection, where the controller actuates the fuel injectors to retard fuel injection timing to the engine cylinders. Other aspects of the warm-up strategy may include adjustments of spark timing, idle speed, air-to-fuel ratio, and turbocharger operation. At cold-start, these and possibly other aspects of engine operation, are optimized for fast catalyst (e.g., TWC) warm-up, and thus are not optimized for minimal particle emissions. If the controller determines that the engine is operating under cold start conditions then the method progresses to 406.

At 406 the method includes closing the valve of the central bypass passage of the GPF or maintaining the valve in the closed position (e.g., if it is already closed). As a result, all or most of the exhaust gas from the engine cylinders is directed through the peripheral flow passages and through the GPF. Thus, the GPF may filter the soot particulate matter out of the exhaust gas before the exhaust gas is expelled from the engine. In response to cold start conditions, the controller may signal an actuator of the valve in the central bypass passage to actuate the valve into the closed position such that the valve plate of the valve blocks exhaust gas from flowing through the bypass passage. Alternatively, if the valve of the central bypass passage is already fully closed, the controller may not send a signal to the valve actuator in order to maintain the valve in the close position. In alternative embodiments, the valve may be actuated to move to a partially closed position, as opposed to entirely closed, so long as the ECD continues to operate to remove a desired amount of soot from the exhaust gas as dictated by emission standards (i.e., valve may be 10% open to suit engine operating conditions, while still meeting emission standards). Having closed or maintained a closed valve in the central bypass passage of the ECD, the method progresses to 408.

At 408, the method includes the controller assessing if the engine warm-up period (i.e., cold start conditions or warm-up strategy) is complete. If the controller determines that the engine is still acting under warm up conditions, then the method progresses to 410. As one example, the controller may determine that the engine warm-up period is not complete if the engine temperature is still below the threshold temperature. As another example, the controller may determine that the engine warm-up period is not complete if fuel injection is still late (e.g., retarded) relative to a threshold or standard fuel injection timing during engine running conditions. As yet another example, the controller may determine that the warm-up period is not compete if a threshold amount of time (e.g., for engine warm-up) has not expired.

At 410, the method includes maintaining the valve in the central bypass passage closed. Maintaining the valve closed may not require any action from the actuator controlling the valve of the central bypass passage. After 410 occurs the method returns to 408. The method may cycle between 408 and 410 until the controller determines that engine warm up is complete and the method continues to 412.

At 412, the method includes opening the valve in the central bypass passage in response to the engine warm-up period being complete following the cold start. Having completed warm-up conditions, and so long as no other engine operations are occurring that produce soot above a threshold level (e.g., where the threshold level is based on an emission standard), the controller may signal the actuator of the valve in the central bypass passage of the GPF to actuate the valve to change position from closed to open. Changing position of the valve from closed to open allows exhaust gasses to pass through the central bypass passage, bypassing the GPF in the process. In one example, the method at 412 may include fully opening the valve in the central bypass passage. As another example, the method at 412 may include increasing the opening of the valve so that it is partially open. In some examples, the opening of the valve may increase as the engine warms up (e.g., as the engine temperature increase or as fuel injection returns from the retarded state to the baseline, non-retarded state). Once the valve is successfully opened (either fully opened or partially opened, depending on engine operating conditions), method 400 continues to 424 (as discussed further below).

Returning to 404, if the controller determined that the engine is not operating under cold start conditions, then the method proceeds to 414. At 414, the method includes determining if active GPF regeneration conditions are met. Active GPF regeneration conditions may include a buildup of particulate matter (i.e., soot and/or ash) above a threshold in the GPF such that a pressure drop across the GPF is greater than a threshold level. As one example, the threshold level may be based on a level that results in increased backpressure on the engine cylinders that causes a threshold percentage decrease in engine torque output. Furthermore, the controller may be programmed to detect a specific operating condition, such as steady highway cruise, before determining regeneration conditions are being met. If the controller determines that active GPF regenerations conditions are met at 414, then the method proceeds to 416. At 416, the method includes closing the valve in the central bypass passage and regenerating the GPF. Closing the valve occurs as mentioned before, via an actuator coupled with the valve responding to signals from the controller. The details of regeneration of the GPF and valve operation during regeneration are discussed in greater detail below with reference to FIG. 5. Having completed regeneration, and if no other engine operating conditions are detected that require a change in valve position, the method 400 will come to an end.

Returning to 414, if active GPF regeneration conditions are not met, then the method proceeds to 418. At 418, the method includes determining if the vehicle is accelerating. Acceleration may be detected based on an increase in opening of the throttle, an increased rate of fuel injection, and/or an increase in pedal position above a threshold. Strong acceleration (e.g., a tip-in or pedal position increase over a threshold) may lead to an increase in engine soot output. Thus, in response to engine acceleration (or an acceleration over a threshold), the controller may actuate the valve to fully close or partially close (via sending a signal to the actuator coupled to the valve) if the valve is not already closed by a desired amount. A threshold for acceleration may be used to determine when soot is being produced at a level warranting the controller to actuate a change in valve position in order to meet emission standards. If the vehicle is accelerating, or accelerating above a predetermined threshold, then the method proceeds to 420.

At 420, the method includes closing (or partially closing) the valve in the central bypass passage. As discussed in 418, in response to vehicle acceleration, or acceleration above a predetermined threshold that is known to cause soot above a threshold level, the controller may signal the valve actuator to change the valve position to a fully closed or partially closed position (e.g., the controller may decrease the amount of opening of the valve). Determining whether to partially or fully close the valve may be dependent on a number of operating conditions, such as, determining how closed the valve must be in order to reduce soot in the exhaust gas by a threshold amount, a pressure in the ECU, percentages of exhaust gas moving through the central bypass passage and peripheral flow passages, a temperature of the exhaust gas, an air to fuel ratio, etc. If the actuator fully closes the valve (i.e., moves valve to the first position) then all of the exhaust gasses will pass through peripheral flow passages (such as peripheral passages 230 shown in FIGS. 2A-3, downstream to the GPF, where the increased soot output from acceleration may be better captured in the filter. If the actuator partially closes the valve (i.e., an intermediate position between the first and second positions) then an increased percentage of exhaust gasses will pass through peripheral flow passages, while the remaining percentage will continue to flow through the now partially obfuscated central bypass passage. Having closed, or partially closed, the valve controlling access to the central bypass passage, method 400 continues to 424 (as discussed further below). It will be appreciated that in an alternative embodiment, the soot generated by increased acceleration (or acceleration above a predetermined threshold), may be dealt with by engine calibration, thereby negating the need for the controller to close the valve in order to meet soot thresholds. In such an alternative embodiment, the method would not continue to 420, but to 422 instead.

Returning to 418, if the vehicle is not accelerating, or not accelerating at or above a predetermined threshold to trigger closing of the valve as described above, then the method continues to 422. At 422, the method includes maintaining the open (or partially open) position of the valve in the central bypass passage. Maintaining the open valve (i.e., in the second position) may require no signal from the controller to the actuator of the valve. It will be appreciated that other operating conditions may be concurrently occurring so as to require the valve to be partially open instead of fully open, despite no acceleration detected to warrant closing of the valve in aforementioned 418. Furthermore, some operating conditions may be concurrently occurring that lead the controller to fully close the valve position despite no acceleration detected to warrant closing of the valve in aforementioned 418. For example, at 422 the controller may detect a pressure signal that triggers the controller to regenerate the GPF. Under these conditions, the controller may determine that regeneration is more crucial to engine operation than maintaining an open valve, and in response, the controller may signal the actuator to close the valve so that regeneration may occur, despite no acceleration detected to warrant closing of the valve in aforementioned 418. It will be appreciated that despite being schematically depicted as a strict sequential process, that the controller may be simultaneously tracking all vehicle operations (e.g., determining cold start conditions, regeneration conditions, acceleration conditions, etc.) and continually ranking the priority of said conditions in order to determine optimal valve position.

At 424, the method includes adjusting engine operation based on a change in the pressure across the GPF due to adjusting the position of the valve. For example, following adjusting the valve during the methods described above, the controller may determine the pressure across the GPF by taking a first pressure reading within the ECD system, upstream of the GPF but downstream of the TWC, and a second pressure downstream of the GPF. In one example, the second pressure reading may be atmospheric pressure. Thus, determining the pressure drop across the GPF may include comparing the first pressure reading to the second pressure reading, and determining if said pressure drop is influencing torque output of the engine. As another example, the controller may determine the pressure upstream of the GPF and use this pressure to estimate a backpressure on the engine and whether torque output is being decreased beyond a threshold level due to the backpressure. For example, when the valve is in the first position (closed to exhaust gasses bypassing the GPF, such as the valve position shown in FIG. 2A) then all exhaust gasses entering the ECD pass through peripheral flow passages and to the downstream GPF. When this occurs, the pressure drop through the GPF causes an extra load on the engine, which may reduce engine torque output. The pressure drop may reduce torque output enough that the controller may take steps to compensate by increasing engine torque output. As such, the method at 424 may include adjusting the throttle opening, spark timing, or turbocharger boost (in a turbocharged engine) to increase engine torque output so that the effect of the GPF backpressure is not apparent to the driver. For example, the controller may increase the throttle opening to increase torque as the pressure drop across the GPF (or the pressure upstream of the GPF) increases. The amount of pressure drop may also be dependent on how much particulate matter has accumulated in the GPF, and/or on the percentage of gasses flowing through the GPF. For example, the valve may be fully open (i.e., second position) or partially open (i.e., in between first and second position), which allows a portion of exhaust gas to bypass the GPF, but owing to a large amount of particulate matter in the GPF, the pressure drop may be substantial enough for the controller to adjust engine operations based on change in pressure across the GPF. Having adjusted engine operations based on change in pressure across the GPF, method 400 comes to an end.

In this way, a vehicle controller may determine during which engine operating conditions increased soot production is likely to occur and, in response to those operating conditions, signal an actuator of a valve in a central bypass passage of a GPF to adjust the valve accordingly, wherein a closed valve blocks exhaust gas access to the central bypass passage, thereby leading all of the exhaust gas traveling through peripheral flow passages and through pores of the GPF. Comparatively, an open (or partially open) valve allows a portion of exhaust gasses to travel down the central bypass passage and through a center of the GPF without flowing through the pores of the GPF, thereby reducing the amount of exhaust gas traveling through the pores of the GPF. The controller may estimate and/or measure multiple engine operating conditions simultaneously to determine a desired valve position of the valve, which may include the first position, the second position, or an intermediate position between first and second position, as described above.

Turning to FIG. 5, a method 500 is shown for performing a GPF regeneration event in an emission control device including a GPF (such as the ECD 200 and GPF 244 shown in FIGS. 2A-2B and 3). It should be noted that method 500 is a continuation of 416 of FIG. 4.

Method 500 begins at 502 by closing or partially closing the valve in the central bypass passage in response to the controller determining that active GPF regeneration conditions are met, as discussed above with reference to 414 of FIG. 4. The method at 502 may include determining whether to partially close or fully close the valve based on engine operating conditions. For example, full closure of the valve (i.e., the first position) may cause all the heated exhaust gases to pass through pores of the GPF instead of through the central bypass passage in which the valve is installed. As a result, the temperature of the GPF may increase and more soot stored within the GPF may be burned off the filter during the regeneration event. Comparatively, partial closure of the valve (i.e., a position between first and second position) may cause less heated exhaust gases to pass through the pores of the GPF (than if the valve were fully closed) and thus the temperature of the GPF may not increase as much as if the valve were fully closed. As a result, the controller may control a temperature of the GPF during the regeneration event based on a position of the valve. There may be a threshold temperature or temperature range for maintaining the GPF temperature during regeneration. For example, during regeneration, the controller may adjust the valve to maintain the GPF above a lower threshold temperature (e.g., below which soot may not be removed from the filter) and below an upper threshold temperature (e.g., above which degradation of the GPF may occur). Further, by only partially closing the valve, engine power loss (e.g., from increased backpressure from flowing exhaust gas through the GPF) may be reduced. Once the controller has determined whether the valve should be fully or partially closed (and what percentage opening or closing it should be moved into), signaled the valve actuator, and adjusted valve position accordingly, the method proceeds to 504.

At 504, the method includes determining if the GPF is at a regenerative temperature. The GPF temperature may be determined based on output from an exhaust gas temperature sensor positioned proximal to the GPF (such as temperature sensor 16 shown in FIG. 1). The regeneration temperature may be a filter regeneration light-off temperature at which, given sufficient excess oxygen, particulate matter accumulated in the GPF may be oxidized. The temperature for regeneration may be a threshold value or a value range. If it is determined that the GPF is not at the regenerative temperature (e.g., less than), then the method proceeds to 506. At 506, the method includes increasing the exhaust gas temperature in an effort to bring the GPF to the regeneration temperature. The exhaust gas temperature may also be controlled to achieve a desired rate of particulate matter oxidation. Increasing exhaust gas temperature will cause the temperature of the GPF to increase as well. Increasing the exhaust gas temperature at 506 may include one or more of retarding spark timing, increasing throttle opening (e.g., opening of throttle 62 of FIG. 1), increasing engine speed, increasing engine load, etc. Method 500 will continue to cycle between 506 and 504, until the controller determines (at 504) that the GPF is at suitable temperatures for regeneration. If it is determined that the GPF is at (e.g., greater than or equal to) the regeneration temperature, method 500 proceeds to 508.

At 508, the method includes initiating active regeneration of the GPF. Initiation of active GPF regeneration may include initiating deceleration fuel shut-off (DFSO) to provide oxygen for particulate matter (e.g., soot) oxidation. In some examples, DFSO may be initiated only under select conditions; for example, DFSO may be initiated if engine speed and/or load are below respective thresholds, and/or if other inputs (e.g., accelerator pedal position) do not indicate an imminent driver tip-in or request for torque. By initiating DFSO, sufficient levels of excess oxygen may be supplied to the GPF that, in combination with sufficient temperatures, facilitate oxidation of accumulated particulate matter and at least partial regeneration of the GPF. Thus, the GPF may be actively regenerated via excess oxygen received from the engine. Other approaches may be employed to increase excess oxygen at the GPF, alternatively or in addition to DFSO. For example, one or more of throttle opening, air-fuel ratio (e.g., enleanment), and variable cam timing may be adjusted to increase the supply of excess oxygen. Once the controller has initiated active regeneration, the method continues to 510.

At 510, the method includes adjusting the valve in the central bypass passage and a combustion air-to-fuel ratio (A/F) of the engine to maintain the GPF at the regeneration temperature. During regeneration, soot oxidation (i.e., soot combustion) is exothermic. If regeneration is uncontrolled it may increase the temperature in the ECD enough to damage the GPF. The reaction may be controlled using valve control and/or air-to-fuel ratio control. For example, lower exhaust gas flow through the GPF with a higher air-fuel ratio may produce higher temperatures at the GPF, since the high oxygen content promotes fast oxidation, and there is little exhaust gas flowing through the GPF to carry away the heat (owing to an open or partially open valve, which directs a percentage of exhaust gasses through the central bypass passage, leaving a smaller percentage of exhaust gasses to pass through the GPF). Comparatively, higher exhaust gas flow through the GPF (occurring when the valve in the central bypass passage is fully closed or partially closed, which prevents all or most of the exhaust gas from passing through the central bypass passage, respectively) with low air-fuel ratio may cool the GPF, since the exhaust is low in oxygen, and the high exhaust gas flow through the GPF can more quickly carry away whatever heat is produced. Thus, the controller may adjust valve position (via sending a signal to the actuator coupled with the valve plate) and adjust the combustion air-to-fuel ratio (via sending a signal to one or more fuel injectors and/or the throttle valve) to increase or decrease the heat within the ECD system so that temperatures do not fall below those consistent with active regeneration, and do not surge above those that would degrade the GPF (or any other component of the ECD system). For example, the method at 510 may include increasing the air-to-fuel ratio combusted at the engine cylinders while increasing an opening of the valve in the central bypass passage in order to increase the temperature of the GPF if the regeneration temperature is lower than a threshold. As another example, the method at 510 may include decreasing the air-to-fuel ratio combusted at the engine cylinders while decreasing an opening of the valve in the central bypass passage in order to decrease the temperature of the GPF if the regeneration temperature reaches a threshold that reduces component durability (e.g., a temperature that may degrade the GPF). In another embodiment, the method at 510 may additionally or alternatively include enriching the exhaust gas by increasing a fuel injection amount to decrease the GPF temperature, since rich exhaust gas tends to be cooler than lean exhaust gas. In this way, the method at 510 may including adjusting both the valve in the central bypass passage and the combustion air-fuel ratio to maintain the GPF temperature within a desired regeneration temperature range during the regeneration event.

At 512, the method includes determining if regeneration is complete. Determining if regeneration is complete may be based on one or more of the temperature of the GPF indicating that an exothermic reaction (i.e., regeneration) is no longer taking place (e.g., the temperature drops below a threshold) or pressure drop across the GPF. For example, after combusting much of the soot in the GPF during the regeneration process, exhaust gas entering the GPF will be met with less resistance passing through the GPF and the pressure drop will be reduced (compared to before the regeneration event). In this example, the controller may determine that regeneration is complete if the pressure drop across the GPF has reduced below a threshold level. As another example, the threshold level may be a level smaller than the pressure drop across the GPF prior to initiating regeneration. As yet another example, the threshold level may be a set level indicating that a certain percentage of particulate matter (e.g., soot) has been removed from the GPF.

Thus, there may be a threshold pressure drop that signifies that regeneration is complete. If regeneration is not complete, the method continues to 514. At 514, the method includes continuing active regeneration. For example, regeneration may continue by adjusting one or more of the valve in the central bypass passage, the combustion air-to-fuel ratio, the throttle, and/or engine fueling to maintain the regeneration temperature range and continue providing oxygen for regeneration, as described above at 508 and 510. Until the controller has determined that regeneration is complete at 512, the methodology will cycle between 512 and 514. Once the controller has determined that regeneration is complete at 512, the method continues to 516.

At 516, the method includes the controller returning engine actuators to their demanded state and re-opening or increasing the opening of the central bypass valve. The demanded state of vehicle actuators may be determined by the driver (i.e., driver initiated acceleration/deceleration), driving conditions (for example, wet roads may cause a vehicle to initiate four wheel drive), and engine operating conditions (e.g., acceleration, cold-start, regeneration, etc.). In the event that no other engine operating conditions require a closed valve (such as, acceleration or cold start conditions), then the controller may signal the valve actuator to adjust the valve from a fully or partial closed valve position to a partially or fully open valve position. Having adjusted valve position in response to completed regeneration, method 500 comes to an end. The controller may continue to monitor engine operating conditions and make additional valve position adjustments via an actuator, as disclosed in FIG. 4, method 400 for the duration of vehicle operation.

In this way, an emission control device may be constructed with a GPF bypass, such that the ECD (such as ECD 200, seen in FIGS. 2A and 2B) does not take up more space than an exhaust system housing only a TWC and GPF (i.e., an exhaust system sans GPF bypass). Spacing between peripheral flow passages and a central bypass passage of the ECD allow for cooling of the exhaust gasses, which reduces heat of the ECD system and may extend the life of components within the system (since exposure to hot exhaust gasses without a means for cooling can present challenges to component durability). With at least a portion of the valve (e.g., a portion of the valve actuator) positioned external to the central bypass passage, in conjunction with the spacing surrounding the perimeter of the central bypass passage, the valve and/or valve actuator may be accessed more easily, thereby increasing the ease of servicing or replacing the valve. Furthermore, a shape of the converging cone portion of the TWC housing (such as TWC housing 204 seen in FIG. 2A) allows for an increased amount of exhaust gasses to be funneled toward the central bypass passage when the valve is open or partially open than if the TWC housing had a straight configuration that did not angle toward the central bypass passage.

The technical effect of the providing a converging cone upstream of the first portion of the central bypass passage is to direct a larger percentage of the exhaust gasses to the central bypass passage, thereby allowing a greater percentage of exhaust gas to bypass the GPF and reduce the amount of incombustible particulate matter getting trapped within pores of the GPF, when the valve is in a second (e.g., open) position. The technical effect of spacing one or more outer (e.g., peripheral) passages disposed between the converging cone and the GPF away from the central bypass passage, in addition to positioning at least a portion of the valve actuator of the valve exterior to the central bypass passage, is that the valve may be more easily accessed for repairs and servicing.

As one embodiment an apparatus for an engine emission control device comprises a gasoline particulate filter (GPF) arranged in an exhaust passage, a central bypass passage including a first portion disposed upstream of the GPF and a second portion passing through a center of the GPF, a converging cone forming a portion of the exhaust passage and arranged upstream of and connecting to the first portion, one or more outer passages coupled between the converging cone and the GPF and spaced away from the central bypass passage, and a valve arranged within the first portion. In a first example of the apparatus, the valve includes a valve plate and a valve actuator, where at least a portion of the valve actuator is disposed external to an interior of the first portion of the central bypass passage and the valve plate is positioned within the interior of the first portion of the central bypass passage. A second example of the apparatus optionally includes the first example and further includes wherein at least the portion of the valve actuator disposed external to the interior of the first portion of the central bypass passage is positioned within a space formed between an outer wall of the central bypass passage and an outer wall of the one or more outer passages. A third example of the apparatus optionally includes one or more of the first and second examples, and further includes wherein the converging cone includes a wider, first end and a narrower, second end, where the first end is coupled to an upstream portion of the exhaust passage and the second end is coupled directly to an entrance to the first portion of the central bypass passage. A fourth example of the apparatus optionally includes one or more of the first through third examples, and further includes, wherein the converging cone includes a wall that angles inward from the first end to the second end of the converging cone. A fifth example of the apparatus optionally includes one or more of the first through fourth examples, and further includes, further comprising a diverging cone forming a portion of a housing of the GPF and arranged upstream of the GPF and downstream of the first portion of the central bypass passage, wherein the diverging cone includes a narrower, first end coupled to an outer wall of the first portion of the central bypass passage and a wider, second end coupled to a central portion of the housing of the GPF that surrounds the GPF. A sixth example of the apparatus optionally includes one or more of the first through fifth examples, and further includes, wherein each of the one or more outer passages are coupled between the first end of the converging cone and the second end of the diverging cone. A seventh example of the apparatus optionally includes one or more of the first through sixth examples, and further includes, wherein the one or more outer passages includes a plurality of outer passages spaced circumferentially around an exterior of the central passage but within an outer diameter of one of the exhaust passage upstream of the converging cone or the central portion of the housing of the GPF. An eighth example of the apparatus optionally includes one or more of the first through seventh examples, and further includes, wherein the central portion of the housing of GPF is formed around and encloses filter elements of the GPF and further comprises a second converging cone positioned at a downstream end of GPF, where the central portion of the GPF housing is coupled between the diverging cone and the second converging cone. A ninth example of the apparatus optionally includes one or more of the first through eighth examples, and further includes, wherein the GPF includes a central axis and wherein the central bypass passage is centered along the central axis and wherein the GPF is formed circumferentially around an outer perimeter of the central bypass passage.

In another example, a method for an engine emission control device includes during a first condition, adjusting a valve disposed in a central bypass passage upstream of a gasoline particulate filter (GPF) of an exhaust passage, where the central bypass passage passes through a center of the GPF, into a first position to flow exhaust gas from a converging cone forming a portion of the exhaust passage upstream of the central bypass passage and through only peripheral passages surrounding the central bypass passage and connecting a housing of the GPF to the converging cone, and during a second condition, adjusting the valve into a second position to flow at least a portion of the exhaust gas from the converging cone through the central bypass passage. In the first example of the method, the method further comprises following adjusting the valve, adjusting engine operation in response to a pressure drop across the GPF. A second example of the method optionally includes the first example and further includes wherein adjusting engine operation includes adjusting one or more of turbocharger boost, spark timing, and a throttle and wherein the pressure drop is based on a pressure measured upstream of GPF in the exhaust passage. A third example of the method optionally includes one or more of the first and second examples, and further includes wherein adjusting the valve into the first position to flow exhaust gas from the converging cone and through only the peripheral passages includes flowing exhaust gas from the converging cone to an entrance of the peripheral passages coupled to a wider portion of the converging cone, flowing exhaust gas through the peripheral passages, flowing exhaust gas into a diverging cone forming an entrance to the GPF within a housing of the GPF, and flowing exhaust gas through filter elements of the GPF. A fourth example of the method optionally includes one or more of the first through third examples, and further includes wherein adjusting the valve into the second position includes flowing exhaust gas from a wider portion of the converging cone to a narrower portion of the converging cone coupled directly to an inlet to the central bypass passage to direct exhaust gas into the central bypass passage, following a converging inner surface of the converging cone, and flowing exhaust gas from the central bypass passage to a portion of the exhaust passage downstream of the GPF. A fifth example of the method optionally includes one or more of the first through fourth examples, and further includes, wherein the first condition includes one or more of a cold start condition including an engine temperature being below a threshold temperature, an active regeneration event of the GPF, and vehicle acceleration over a threshold level. A sixth example of the method optionally includes one or more of the first through fifth examples, and further includes wherein the second condition includes one or more of following the cold start condition when the engine temperature is at or above the threshold temperature or when vehicle acceleration is not over the threshold level and the active regeneration event of the GPF is not occurring. A seventh example of the method optionally includes one or more of the first through sixth examples, and further includes, wherein the first position is a fully closed position and the second position is a fully open position and further comprising adjusting the valve into a third position, where the third position is between the first position and the second position, during a third conditions, where the third condition includes during the active regeneration event of the GPF and where the third position is based on a temperature of the GPF and a desired regeneration temperature of the GPF.

In another embodiment, a system for an engine emission control device comprises a gasoline particulate filter (GPF) arranged in an exhaust passage and having a central axis, a three-way catalyst arranged in the exhaust passage upstream of the GPF, a central bypass passage including a first portion disposed upstream of the GPF and a second portion passing through a center aperture of the GPF formed around the central axis, a converging cone forming a downstream portion of a housing of the three-way catalyst and connecting to the first portion of the central bypass passage, a diverging cone forming an upstream portion of a housing of the GPF and arranged downstream of an entrance to the first portion of the central bypass passage, a plurality of peripheral passages positioned between the converging and diverging cones and spaced away from the central passage, a valve disposed within the first portion of the central bypass passage, and a controller with computer readable instructions for: adjusting a position of the valve to adjust a percentage of exhaust gas flowing through the outer passages and through the GPF and adjusting engine operation in response to adjusting the position of the valve and based on a pressure upstream of the GPF. In a first example of the system, where the valve includes a valve plate arranged within the first portion of the central bypass passage and a valve actuator, where at least a portion of the valve actuator is external to the first portion of the central bypass passage and wherein adjusting the position of the valve includes increasing an amount of opening of the valve to decrease the percentage of exhaust gas flowing through the outer passages through the GPF and decreasing the amount of opening of the valve to increase the percentage of exhaust gas flowing through the outer passages and through the GPF.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An apparatus, comprising:
    a gasoline particulate filter (GPF) arranged in an exhaust passage;
    a central bypass passage including a first portion disposed upstream of the GPF and a second portion passing through a center of the GPF;
    a converging cone forming a portion of the exhaust passage and arranged upstream of and connecting to the first portion;

one or more outer passages coupled between the converging cone and the GPF and spaced away from the central bypass passage; and
a valve arranged within the first portion.

2. The apparatus of claim 1, wherein the valve includes a valve plate and a valve actuator, where at least a portion of the valve actuator is disposed external to an interior of the first portion of the central bypass passage and the valve plate is positioned within the interior of the first portion of the central bypass passage.

3. The apparatus of claim 2, wherein the at least the portion of the valve actuator disposed external to the interior of the first portion of the central bypass passage is positioned within a space formed between an outer wall of the central bypass passage and an outer wall of the one or more outer passages.

4. The apparatus of claim 1, wherein the converging cone includes a wider, first end and a narrower, second end, where the first end is coupled to an upstream portion of the exhaust passage and the second end is coupled directly to an entrance to the first portion of the central bypass passage.

5. The apparatus of claim 4, wherein the converging cone includes a wall that angles inward from the first end to the second end of the converging cone.

6. The apparatus of claim 4, further comprising a diverging cone forming a portion of a housing of the GPF and arranged upstream of the GPF and downstream of the first portion of the central bypass passage, wherein the diverging cone includes a narrower, first end coupled to an outer wall of the first portion of the central bypass passage and a wider, second end coupled to a central portion of the housing of the GPF that surrounds the GPF.

7. The apparatus of claim 6, wherein each of the one or more outer passages are coupled between the first end of the converging cone and the second end of the diverging cone.

8. The apparatus of claim 6, wherein the one or more outer passages includes a plurality of outer passages spaced circumferentially around an exterior of the central passage but within an outer diameter of one of the exhaust passage upstream of the converging cone or the central portion of the housing of the GPF.

9. The apparatus of claim 6, wherein the central portion of the housing of GPF is formed around and encloses filter elements of the GPF and further comprises a second converging cone positioned at a downstream end of GPF, where the central portion of the GPF housing is coupled between the diverging cone and the second converging cone.

10. The apparatus of claim 1, wherein the GPF includes a central axis and wherein the central bypass passage is centered along the central axis and wherein the GPF is formed circumferentially around an outer perimeter of the central bypass passage.

11. A method, comprising:
responsive to a first condition determined by a controller, adjusting a valve disposed in a central bypass passage upstream of a gasoline particulate filter (GPF) of an exhaust passage with the controller, where the central bypass passage passes through a center of the GPF, into a first position to flow exhaust gas from a converging cone forming a portion of the exhaust passage upstream of the central bypass passage and through only peripheral passages surrounding the central bypass passage and connecting a housing of the GPF to the converging cone; and
responsive to a second condition determined by the controller, adjusting the valve with the controller into a second position to flow at least a portion of the exhaust gas from the converging cone through the central bypass passage.

12. The method of claim 11, further comprising following adjusting the valve, adjusting engine operation in response to a pressure drop across the GPF.

13. The method of claim 12, wherein adjusting engine operation includes adjusting one or more of turbocharger boost, spark timing, and a throttle, and wherein the pressure drop is based on a pressure measured upstream of GPF in the exhaust passage.

14. The method of claim 11, wherein adjusting the valve into the first position to flow exhaust gas from the converging cone and through only the peripheral passages includes flowing exhaust gas from the converging cone to an entrance of the peripheral passages coupled to a wider portion of the converging cone, flowing exhaust gas through the peripheral passages, flowing exhaust gas into a diverging cone forming an entrance to the GPF within the housing of the GPF, and flowing exhaust gas through filter elements of the GPF.

15. The method of claim 11, wherein adjusting the valve into the second position includes flowing exhaust gas from a wider portion of the converging cone to a narrower portion of the converging cone coupled directly to an inlet to the central bypass passage to direct exhaust gas into the central bypass passage, following a converging inner surface of the converging cone, and flowing exhaust gas from the central bypass passage to a portion of the exhaust passage downstream of the GPF.

16. The method of claim 11, wherein the first condition includes one or more of a cold start condition including an engine temperature being below a threshold temperature, an active regeneration event of the GPF, and vehicle acceleration over a threshold level.

17. The method of claim 16, wherein the second condition includes one or more of following the cold start condition when the engine temperature is at or above the threshold temperature or when vehicle acceleration is not over the threshold level and the active regeneration event of the GPF is not occurring.

18. The method of claim 17, wherein the first position is a fully closed position and the second position is a fully open position, and further comprising adjusting the valve into a third position, where the third position is between the first position and the second position, during a third condition, where the third condition includes during the active regeneration event of the GPF and where the third position is based on a temperature of the GPF and a desired regeneration temperature of the GPF.

19. A system, comprising:
a gasoline particulate filter (GPF) arranged in an exhaust passage and having a central axis;
a three-way catalyst arranged in the exhaust passage upstream of the GPF;
a central bypass passage including a first portion disposed upstream of the GPF and a second portion passing through a center aperture of the GPF formed around the central axis;
a converging cone forming a downstream portion of a housing of the three-way catalyst and connecting to the first portion of the central bypass passage;
a diverging cone forming an upstream portion of a housing of the GPF and arranged downstream of an entrance to the first portion of the central bypass passage;
a plurality of peripheral passages positioned between the converging and diverging cones and spaced away from the central bypass passage;

a valve disposed within the first portion of the central bypass passage; and a controller with computer readable instructions for:
adjusting a position of the valve to adjust a percentage of exhaust gas flowing through the peripheral passages and through the GPF and adjusting engine operation in response to adjusting the position of the valve and based on a pressure upstream of the GPF.

20. The system of claim 19, where the valve includes a valve plate arranged within the first portion of the central bypass passage and a valve actuator, where at least a portion of the valve actuator is external to the first portion of the central bypass passage and wherein adjusting the position of the valve includes increasing an amount of opening of the valve to decrease the percentage of exhaust gas flowing through the peripheral passages and through the GPF and decreasing the amount of opening of the valve to increase the percentage of exhaust gas flowing through the peripheral passages and through the GPF.

* * * * *